Figures 1, 2, 3, 4, 5, 6, 7, 8, 9:
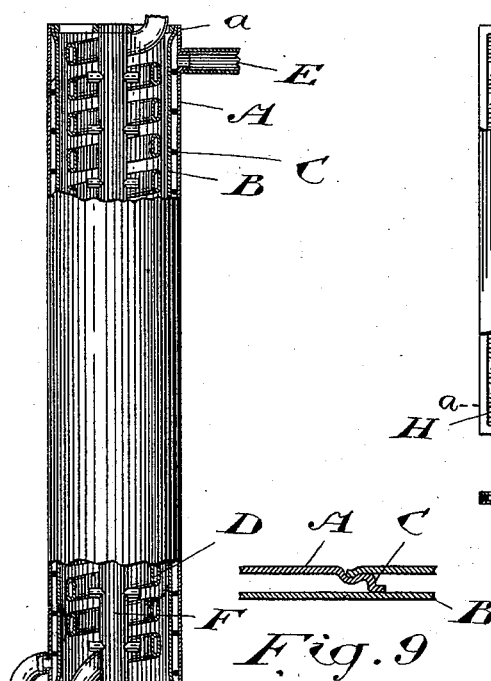

(No Model.)

W. MORRISON.
WATER HEATER OR COOLER.

No. 531,000. Patented Dec. 18, 1894.

Witnesses
Fred Clarke
G. W. Neff

Inventor
Wm Morrison
by Ridout & Maybee
Attys

UNITED STATES PATENT OFFICE.

WILLIAM MORRISON, OF TORONTO, CANADA.

WATER HEATER OR COOLER.

SPECIFICATION forming part of Letters Patent No. 531,000, dated December 18, 1894.

Application filed March 3, 1894. Serial No. 502,170. (No model.)

*To all whom it may concern:*

Be it known that I, WILLIAM MORRISON, manufacturer, of the city of Toronto, in the county of York and Province of Ontario, Canada, have invented certain new and useful Improvements in Water Heaters or Coolers, of which the following is a specification.

The object of my invention is to devise a simply constructed water heater or cooler which will deliver a continuous current of water, and it consists, essentially, of two thin metal plates inclosing a water space and having a feather or partition arranged between them to divide the water space so that a channel is formed to convey the water over successive portions of the heating surface. The heater as thus constructed may, if so desired, be arranged in the form of a cylinder and used either with or without a supplemental coil of flattened tubing, the means of heating being preferably a Bunsen or other burner adapted to use either liquid or gaseous hydrocarbon fuel, the whole being constructed in detail as hereinafter more particularly described.

Figure 1, is a sectional elevation of a water heater constructed in accordance with my invention. Fig. 2, is a sectional plan view of a pair of flat plates having an alternative arrangement of the feather or partition used to divide the water space. Fig. 3, is a section through *a—b*, Fig. 2. Figs. 4, 5, 6 and 7 show various methods of forming the feather or partition. Fig. 8, is a sectional elevation of a cylinder using the feather or partition shown in Fig. 4. Fig. 9, shows a variation of the arrangement shown in Fig. 8.

In the drawings like letters of reference indicate corresponding parts in the different figures.

In Fig. 1, A, and B, are two thin metal cylinders inclosing a narrow water space between them. This water space is closed at either end by bringing the ends of the cylinders together, as indicated at *a*. C, is a spiral feather or partition which extends across the water space and thus forms the said water space into what is substantially a spiral water tube or coil. D, is a supplementary coil of tubing which is flattened in cross-section, as shown, so as to expose a large surface to the action of the heat. This coil connects at its lower end with the water space between the two cylinders. E, is a pipe connecting with the said water space at its upper end. F, is a burner adapted for the use of liquid or gaseous hydrocarbon fuel. The water enters the heater through the pipe E, and emerges from the upper end of the coil D, or vice versa, heated to a degree proportionate to the rapidity of the flow and the intensity of the heat from the burner F.

In Fig. 2, the cylinders A, and B, are represented by two flat plates and the water space between them instead of being divided spirally, is so divided by the feather C, as to cause the water to flow alternately from side to side of the water space inclosed by the plates, entering at G, and emerging at H. These plates could also be formed into a cylinder maintaining the same arrangement of the feather or partition. If the cylinder is used in a horizontal position, the inlet is preferably located at *c*, so that the cold water flows up each side and the steam or hot water is drawn from the top.

In Fig. 8, the outer cylinder A, is formed of a long ribbon of metal wound spirally on a feather or partition such as shown in Fig. 4.

In Fig. 9, the long ribbon shown in Fig. 8, has the feather or partition formed integral with it. This method of forming the outer casing is well adapted for use when the feathers are arranged as shown in Fig. 2.

Figs. 5, 6 and 7 show alternative methods of forming the feather or partition when the water space is inclosed by two undivided plates or cylinders, as shown in Figs. 1 and 2. It will be easily seen that by arranging plates or cylinders as described, a much greater heating surface can be obtained than by the use of ordinary coils, and that a heater constructed in accordance with my invention will be both cheap and effective. The flattened section used in the supplemental coil gives it a large measure of the advantages possessed by the outer shallow water space, which is in effect a flattened coil, and makes such a coil much more effective than an ordinary coil formed of tubing circular in cross-section.

If desired to increase the heating capacity of the heater, several cylinders or plates may be arranged in a nest, the hot water from one passing through the next in order, and so on.

It is of course immaterial whether the heat is applied to the outside or the inside of the cylinder, though I consider the latter the preferable method.

This apparatus may also be used as a cooler by applying ice to the inside or outside of the cylinder and passing the fluid through the apparatus as in the process of heating.

What I claim as my invention is—

1. In a water heater or cooler, two plates inclosing a water space and formed into a cylinder, in combination with a feather or partition arranged to divide the water space so that a channel is formed to convey the water over successive portions of the acting surface, and an inlet and outlet for the water, substantially as and for the purpose specified.

2. In a water heater or cooler, two cylinders inclosing a water space between them in combination with a spirally arranged feather or partition dividing the water space so that a channel is formed to convey the water over successive portions of the acting surface, and an inlet and outlet for the water substantially as and for the purpose specified.

3. In a water heater or cooler, the combination of two plates inclosing a water space; a feather or partition arranged to divide the water space so that a channel is formed to convey the water over successive portions of the heating surface; a coil of tubing connected at one end to the said water space, and a suitable inlet and outlet respectively to the said coil and water space, substantially as and for the purpose specified.

4. In a water heater or cooler, the combination of two plates inclosing a water space; a feather or partition arranged to divide the water space so that a channel is formed to convey the water over successive portions of the heating surface; a coil of flattened tubing connected at one end to the said water space, and an inlet and outlet, substantially as and for the purpose specified.

5. In a water heater or cooler, the combination of two plates inclosing a water space and formed into a cylinder; a feather or partition arranged to divide the water space so that a channel is formed to convey the water over successive portions of the heating surface; a coil of flattened tubing connected at one end to the said water space; suitable inlet and outlet pipes connected respectively to the said coil and water space; and a burner adapted to use liquid or gaseous hydrocarbon fuel, substantially as and for the purpose specified.

Toronto, February 23, 1894.

WILLIAM MORRISON.

In presence of—
A. M. NEFF,
FRED CLARKE.